(12) United States Patent
Aoyagi (10) Patent No.: US 9,285,069 B2
(45) Date of Patent: Mar. 15, 2016

(54) HEAVY LOAD SUPPORT MECHANISM AND HEAVY LOAD LOADING APPARATUS USING THE MECHANISM

(71) Applicant: Tatsuzo Aoyagi, Yamanashi-ken (JP)

(72) Inventor: Tatsuzo Aoyagi, Yamanashi-ken (JP)

(73) Assignee: NISCA CORPORATION, Minamikoma-Gun, Yamanashi-Ken (JP)

( * ) Notice: Subject to any disclaimer, the term of this patent is extended or adjusted under 35 U.S.C. 154(b) by 0 days.

(21) Appl. No.: 14/258,547

(22) Filed: Apr. 22, 2014

(65) Prior Publication Data

US 2014/0319294 A1   Oct. 30, 2014

(30) Foreign Application Priority Data

Apr. 25, 2013 (JP) ................................. 2013-092162

(51) Int. Cl.
*F16M 11/00* (2006.01)
*F16M 11/04* (2006.01)

(52) U.S. Cl.
CPC ....... *F16M 11/046* (2013.01); *F16M 2200/027* (2013.01); *F16M 2200/047* (2013.01)

(58) Field of Classification Search
CPC ....... B66F 3/10; B66F 3/16; Y10T 74/18672; F16M 11/046; F16M 2200/027; F16M 2200/047

See application file for complete search history.

(56) References Cited

U.S. PATENT DOCUMENTS 1,862,759 A  *  6/1932  Morrison ..................... 254/102
2,623,573 A  *  12/1952  Di Gaetano ................. 280/283

FOREIGN PATENT DOCUMENTS

JP           2002-303304 A    10/2002

* cited by examiner

*Primary Examiner* — Amy Sterling
(74) *Attorney, Agent, or Firm* — Manabu Kanesaka (57) ABSTRACT

In supporting a heavy load with a spring member disposed between a fixed frame and a support frame, provided are a follower member that transfers a spring force of the spring member to the support frame, first and second cam surfaces that regulate motion of the follower member, and a biasing device for bringing the follower member into press-contact with the cam surfaces, the first cam surface generates a friction force to reduce an effect of the heavy load, the second cam surface generates a friction force to reduce an effect of the spring force, and the follower member is made movable in an expansion/contraction direction of the spring, and also in a direction crossing the expansion/contraction direction to control engagement of the follower member and the cam surfaces.

11 Claims, 5 Drawing Sheets

Z-Z CROSS SECTION

HEAVY LOAD SUPPORT MECHANISM AND HEAVY LOAD LOADING APPARATUS USING THE MECHANISM

RELATED APPLICATIONS

The present application claims priority from Japanese Application No. 2013-092162 filed Apr. 25, 2013.

BACKGROUND OF THE INVENTION

1. Technical Field

The present invention relates to a heavy load support mechanism for loading and supporting a heavy load or suspending and supporting a heavy load, and more particularly, to improvements in the support mechanism for holding the heavy load in a predetermined height position with stability.

2. Description of the Related Art

Generally, this type of apparatus is comprised of a load stand to load a heavy load, an installation base to install an apparatus on a floor surface, and an up-and-down mechanism for coupling the installation base and the load stand in a predetermined height position, and is known as an apparatus for installing the heavy load in a predetermined height position with stability.

For example, Patent Document 1 discloses a support mechanism which positions and holds a monitor apparatus in a predetermined height position. In the Document, a load table for loading a heavy load such as a monitor and an installation frame for supporting on a floor surface are coupled with an up-and-down mechanism to enable a height position of the load table to be adjusted, and the height position is position-supported with a wedge-shaped cam surface, a pair of friction roller members for pressing the cam surface, and a biasing spring for biasing the right and left roller members. In other words, the load table is fitted and supported in the installation frame to be able to move up and down, a pair of friction rollers attached to the load table press the wedge-shaped cam surface provided in the installation frame, and the height position of the load table is thereby adjusted by friction forces between the friction rollers and the cam surface.

Various types have already been known as such a mechanism for fitting the load stand for supporting a heavy load and the installation frame to enable the height position to be adjusted, and supporting the heavy load by friction forces between the cam surface and the follower member (friction rollers) with biasing means such as a spring.

Patent Document 1 discloses techniques for regulating the heavy load not to move downward in the drop direction by gravity to between the load stand loaded with the heavy load and the installation frame using a brake mechanism to hold the position. Further, such a mechanism is also known that a cam mechanism is provided between a support member for supporting the heavy load and a biasing spring to adjust an increase/decrease of the spring force.

PRIOR ART DOCUMENT

Patent Document

[Patent Document 1] Japanese Unexamined Patent Publication No. 2002-303304

DISCLOSURE OF INVENTION

Problems to be Solved by the Invention

As described above, various methods are adopted for the mechanism for placing a heavy load on the load stand supported on the installation surface, and holding its height position at a predetermined height. A first method is a holder mechanism for fixing the installation stand and load stand in beforehand designed height positions, a second method is an up-and-down mechanism for coupling the installation stand and load stand with an up-and-down mechanism to vary a height position freely and fixing the height position with a lock mechanism such as a brake, and a third method is a balance mechanism for balancing the weight of a heavy load and a spring force of a spring via biasing means such as the spring to hold the installation stand and load stand in predetermined height positions.

In the above-mentioned first method, it is not possible to adjust the height position of the load stand relative to the installation stand, and therefore, it is not possible to adapt to the eye line or work height of a person to use. Further, in the second method, it is burdensome operating the lock mechanism, and for example, work for fixing a large-capacity heavy load with the lock mechanism while holding its height position is burdensome and is concurrently difficult.

Then, as the mechanism for holding a position of a heavy load in a predetermined position relatively with ease, it is used frequently placing the heavy load on the load stand and holding in the predetermined height position by the spring force of the spring disposed between the stand and the installation stand.

However, in supporting the heavy load by the spring force of the spring or the like, when the weight of the heavy load and the spring force become unbalanced, the height position of the heavy load is unstable vertically. The imbalance causes a problem that the height position changes when the weight of the heavy load varies with the difference between apparatuses in production and another problem that the height position becomes unstable since the spring force of the spring varies in proportion to its displacement amount.

For example, in the mechanism for position-holding the height position of the load stand by the brake force by the cam surface and friction rollers as proposed in Patent Document 1, there is a problem that the apparatus increases in size. As described previously, in the mechanism proposed in the Document, the wedge-shaped cam surface is disposed along the direction for moving up and down by the weight of the heavy load, and the friction rollers are brought into press-contact with the cam surface with the spring to support the heavy load by friction forces therebetween. Accordingly, when the heavy load to place is large, it is necessary to form the wedge-shaped cam surface in a gentle inclined surface or increase the spring force of the spring pressing the friction roller against the cam surface.

Then, when the inclined cam surface disposed in the action direction of gravity is made a gentle shape, the apparatus increases in the width direction. Further, when the spring force of the spring is set to be large, it is necessary to design the spring length of the spring to be long, leading to increases in size of the apparatus. Thus, being not limited to the apparatus of Patent Document 1, in the conventional apparatuses, the spring force of the spring is adjusted with the cam surface to act on the load member for supporting the heavy load, and therefore, known is the problem of increases in size of the apparatus when the heavy load is large capacity so as to concurrently hold the heavy load in a stable height position.

Therefore, the inventor of the present invention arrived at the idea of transferring a spring force of a spring via a follower member movable in the direction crossing the action direction of gravity without directly acting on a load support member that supports a heavy load, shifting the follower member in the cross direction while concurrently moving up and down in the action direction of gravity by a cam surface and the biasing force for biasing to the cam surface, and thereby equalizing the spring force of the spring by the weight of the heavy load to support and the cam surface.

It is an object of the present invention to provide a heavy load support mechanism for enabling an almost equalized spring balance to be obtained in a relatively long stroke range in holding a heavy load supported on a support frame in a predetermined height position by a spring force of a spring member, and thereby enabling the height position of the heavy load to be set relatively freely.

BRIEF SUMMARY OF THE INVENTION

To attain the above-mentioned object, the present invention is characterized by providing, in supporting a heavy load with a spring member disposed between a fixed frame and a support frame, a follower member that transfers a spring force of the spring member to the support frame, first and second cam surfaces that regulate motion of the follower member, and biasing means for bringing the follower member into press-contact with the cam surfaces, where the first cam surface generates a friction force to reduce an effect of the heavy load, the second cam surface generates a friction force to reduce an effect of the spring force, and the follower member is made movable in an expansion/contraction direction of the spring, and also in a direction crossing the expansion/contraction direction to control engagement of the follower member and the cam surfaces.

The present invention is further described specifically. A mechanism is provided with a fixed frame (1), a support frame (2) disposed to be able to relatively approach and separate from the fixed frame, a spring member (3) disposed between the fixed frame and the support frame to expand and contract in a shift direction of the support frame, a follower member (7) disposed movably in a direction crossing an expansion/contraction direction of the spring member to transfer a spring force of the spring member to the support frame, a cam member (8) having a cam surface (9) for increasing/decreasing action of the spring force exerted on the support frame from the spring member to adjust, and biasing means (10) for bringing the follower member into press-contact with the cam surface.

Then, the above-mentioned cam member has a first cam surface (11a) and a second cam surface (11b) that balance weight of the heavy load and the spring force of the spring member acting on the follower member, the first cam surface (11a) is engaged in the follower member so as to generate a friction force to reduce the weight of the heavy load exerted on the follower member, and the second cam surface (11b) is engaged in the follower member so as to generate a friction force to reduce the spring force exerted on the follower member. The follower member is configured to shift in the expansion/contraction direction of the spring member and concurrently in the direction crossing the expansion/contraction direction along the first and second cam surfaces by the spring force of the spring member, a biasing force of the biasing member and the weight of the heavy load.

Effect of the Invention

In the present invention, in supporting a heavy load with the spring member between the fixed frame and the support frame, the follower member for causing the spring force to act on the heavy load is shifted in the expansion/contraction direction and concurrently in the direction crossing the expansion/contraction direction by the cam surface that increases/decreases the spring force to adjust and the biasing force for bringing into press-contact with the cam surface, while being moved up and down in the action direction of gravity along the cam surface. Therefore, the invention has the following effects.

The spring force of the spring member that expands and contracts in the gravity direction of the heavy load is transferred to the support frame of the heavy load via the follower member, the follower member is provided with the first cam surface for reinforcing the spring force and the second cam surface for reducing the spring force, and it is thereby possible to hold the heavy load with stability without being affected by a change in weight, and to set the height position to support the heavy load freely to some extent.

In other words, in transferring the spring force of the spring member that expands and contracts in the gravity direction of the heavy load to the support frame via the follower member, it is configured that the friction force to reduce the effect of the heavy load occurs between the first cam surface and the follower member in the expansion state in which the spring force is weak, and that the friction force to reduce the effect of the spring conversely occurs in the contraction state in which the spring force is strong, and therefore, when the weight of the heavy load changes to some extent or the height position of the support frame that supports the heavy load changes vertically to some extent, it is possible to hold the heavy load relatively with stability.

Further, the cam surface and the expansion/contraction direction of the spring of the present invention are disposed in the same direction, and therefore, as compared with the case where the cam surface and the spring are disposed in the orthogonal directions, it is possible to achieve making the apparatus small and compact.

BRIEF DESCRIPTION OF THE SEVERAL VIEWS OF THE DRAWINGS

FIGS. 1A and 1B contain explanatory views of a heavy load loading apparatus (Embodiment 1) according to the present invention, where

FIGS. 2A and 2B contain explanatory views of a heavy load support mechanism in the apparatus of FIGS. 1A and 1B, where

FIGS. 3A to 3C contain explanatory views illustrating an action relationship between an operation state and force of the heavy load support mechanism in FIGS. 2A and 2B, where

FIGS. 4A and 4B contain explanatory views illustrating the entire configuration of a heavy load loading apparatus (Embodiment 2) according to the invention, where FIGS. 5A and 5B contain explanatory views illustrating a relationship between an operation state and force of a heavy load support mechanism in the apparatus (Embodiment 2) of FIGS. 4A and 4B, where

DETAILED DESCRIPTION OF THE INVENTION

Figure 1A:
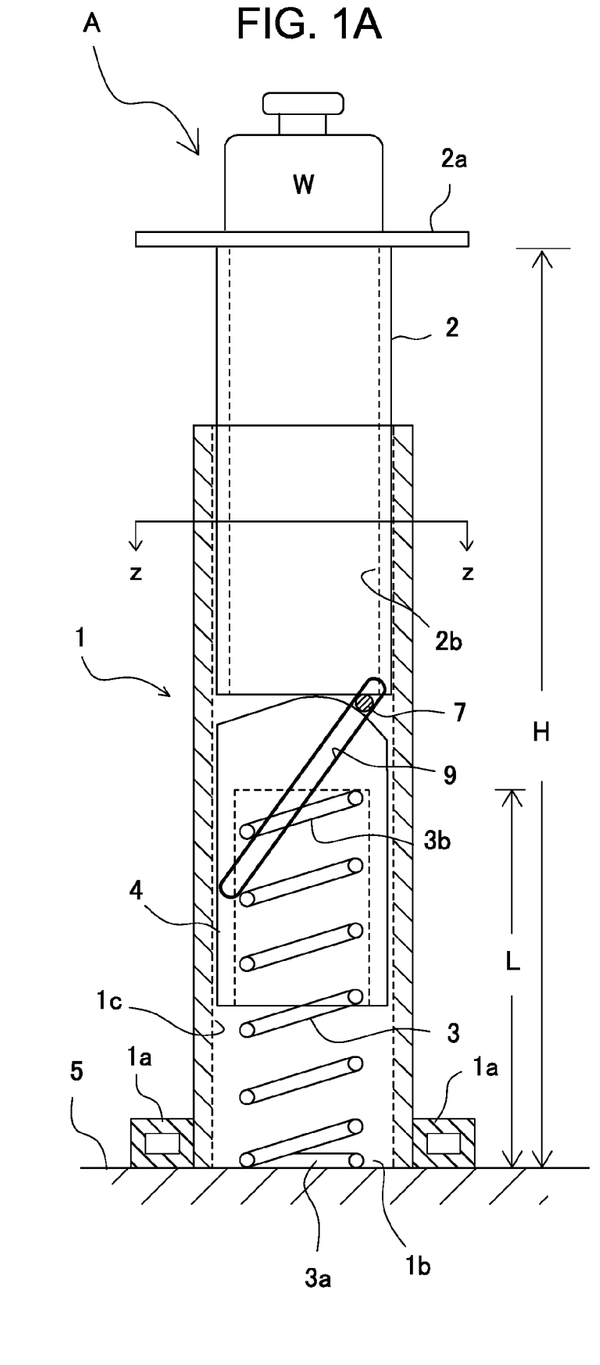
FIG. 1A shows the entire configuration.
Figure 1B:
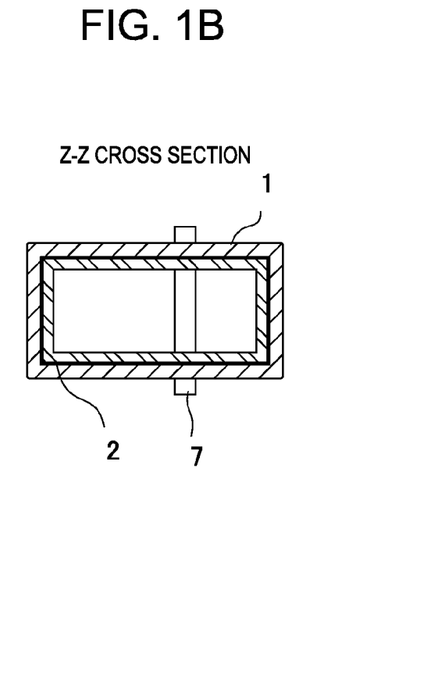
FIG. 1B shows a sectional view taken along line Z-Z.

The present invention will specifically be described below based on preferred Embodiments as shown in the figures. FIGS. 1A and 1B show one Embodiment of a heavy load loading apparatus A adopting the invention. The heavy load loading apparatus A is comprised of a fixed frame 1, support frame 2, spring member 3 and support mechanism.

The fixed frame 1 is fixed to an installation surface 5 such as a floor surface and table surface with anchor bolts or the like, or is placed movably with casters or the like. In addition thereto, the fixed frame is installed with an appropriate structure corresponding to the structure of the construction (building, mechanical apparatus, or the like) and the use. The fixed frame 1 of FIG. 1A is comprised of an installation portion 1a which is placed and installed on the installation surface 5, a spring fixing portion 1b, and support frame fit portion 1c.

The installation portion 1a shown in the figure is configured in a fixed base structure to be placed on the floor surface with stability, and movable casters are attached to the portion corresponding to its use. The spring fixing portion 1b is comprised of a fit portion (concave dent portion) for fixing a fixed end 3a of the coil spring member 3 described later. Further, the fit portion 1c is formed in the shape of a tube for fitting and supporting the support frame 2 described later.

Then, the fixed frame 1 is placed on the installation surface 5 such as a floor surface with stability, and with the spring member 3 fixed inside, is configured to fit and support the support frame 2 to enable the frame 2 to move up and down in the action direction of gravity. The heavy load loading apparatus A shown in the figure is comprised of a placement stand of a television monitor or the like, and therefore, the support frame 2 is positioned at a predetermined height H from the installation surface 5 such as a floor surface. The height position H is intended to be stable at a predetermined height (H±δh) by balancing weight of the heavy load and spring, as described later.

The support frame 2 is disposed to be able to relatively approach and separate from the fixed frame 1. In the Embodiment shown in the figure, the fixed frame 1 as described previously is placed movably on the installation surface (floor surface) 5, and the support frame 2 is fitted and supported in the fixed frame 1 to be able to move up and down (vertical direction in FIG. 1A). In addition thereto, as the support frame, without being fixed to the fixed frame 1, such a structure may be adopted that the support frame is supported, for example, on the construction or apparatus frame, to be able to move up and down with a structure separated from the fixed frame. In other words, the support frame 2 can be attached to the construction frame, apparatus frame or the like different from the fixed frame 1, without being fitted and coupled into the fixed frame 1 and supported to be able to approach and separate from, as long as the support frame 2 and fixed frame are capable of approaching and separating from each other.

The support frame 2 is provided with a placement stand 2a (loading portion) which loads and supports a heavy load 6, and a fit portion 2b that supports the placement stand to be able to move up and down in the direction (vertical direction in FIG. 1A) in which gravity acts, and the fit portion is fitted into the fit portion 1c of the fixed frame 1 as described previously. In other words, the fixed frame 1 and support frame 2 are both in the shape of a tube (rectangular cross section in the frame shown in the figure), are formed so that one is an inner tube and that the other one is an outer tube, and are fitted to be able to approach and separate from each other (expand and contract).

The spring member 3 is comprised of a coil spring having a spring force, and the Embodiment shown in the figure shows the case where the member 3 is comprised of a compression coil spring. As the coil spring, it is preferable to use a linear spring relatively easy to manufacture, and the spring may be comprised of a non-linear spring.

The spring member 3 is fixed to the spring fixing portion 1b of the fixed frame 1 with one end thereof as the fixed end 3a, and a free end 3b of the other end (upper end portion in FIG. 1A) is engaged in a follower member (spring force transfer member) 7 via a cap member 4 described later. Then, the spring member 3 shown in the figure has a spring length L, and is designed with a spring coefficient to support allowable maximum weight Wmax of the heavy load 6. For convenience in description, the case is exemplified that the spring member 3 is configured with a spring coefficient (k) proportional to a displacement (σ) (in addition thereto, the spring member may be comprised of a non-linear coil spring).

The spring member 3 will be described according to FIG. 2B. In the spring member 3, the fixed end 3a is supported by the fixed frame 1, and the free end 3b acts the spring force on the support frame 2. In the spring member 3 shown in the figure, the cap member 4 is fitted into the free end 3b. The cap member 4 is to transfer expansion/contraction operation of the spring free end 3b to the follower member 7 as described below, and is provided with an engagement surface to be in the follower member 7.

The engagement surface of the cap member 4 shown in the figure constitutes a biasing cam surface 11 described later, and the cam surface (biasing cam surface) transfers the spring force Fb of the spring member 3 to the follower member 7. Concurrently therewith, the biasing cam surface 11 is configured so as to provide a biasing force so that the spring force of the spring member 3 brings the follower member 7 into press-contact with a cam surface 9 (control cam surface) of a cam member 8.

The follower member 7 (spring force transfer means) for transferring the spring force Fb of the spring member to the support frame 2 is disposed between the above-mentioned support frame 2 and the spring member 3. The follower member 7 is comprised of a roll member, shaft (rod) member, pin member or the like of circular cross section. The follower member 7 shown in the figure is comprised of a shaft member (hereinafter, referred to as a "rod member"). Then, the follower member 7 is supported to be able to shift in the expansion/contraction direction (up and down in FIG. 1A) of the spring member and in the direction (orthogonal direction in the member shown in the figure; right and left in FIG. 1A) crossing the expansion/contraction direction at a predetermined angle. The support structure will be described later as three-point support.

The above-mentioned follower member 7 receives the spring force from the spring member 3 to hold the position of the support frame 2 that supports the heavy load 6 at a predetermined height H. At this point, the follower member 7 is provided with the cam member 8 that increases or decreases the spring force to adjust. This is because there are unstable factors, in holding the position of the heavy load 6 in the predetermined height position (H) by balancing with the spring force of the spring, caused by the facts such that (1) the spring member 3 changes the spring force in proportion to an expansion/contraction displacement (σ), (2) the height position (H) of the placement stand becomes unstable such as repeating vertical vibrations when an external force temporarily acts on the placement stand 2a of the support frame 2, and that the mass of the heavy load 6 varies with the apparatus difference. Therefore, the cam surface 9 is needed to equalize (smoothen) the spring force of the spring member 3 over a beforehand set length region.

Conventionally, equalization of the spring force has been performed with the cam mechanism disposed on the spring side or the cam mechanism disposed on the support frame side, wear of the cam surface, settling of the spring and the like occur due to the mechanism, and the spring force thereby changes (attenuating) over time to raise accidents such as a drop of the heavy load.

The present invention resolved the problems of wear, settling and the like by the following three-point support structure. The follower member 7 is disposed between mutually opposed weight of the heavy load 6 and the spring force of the spring member 3 to be able to shift in the gravity direction and the direction (orthogonal horizontal direction in the apparatus shown in the figure) crossing the gravity direction at a predetermined angle. Then, the follower member 7 is acted upon by the weight of the heavy load 6 and the spring force of the spring member 3, and concurrently, the cam surface 9 to enhance or suppress the spring force is engaged in a respective different direction.

Figure 3A:
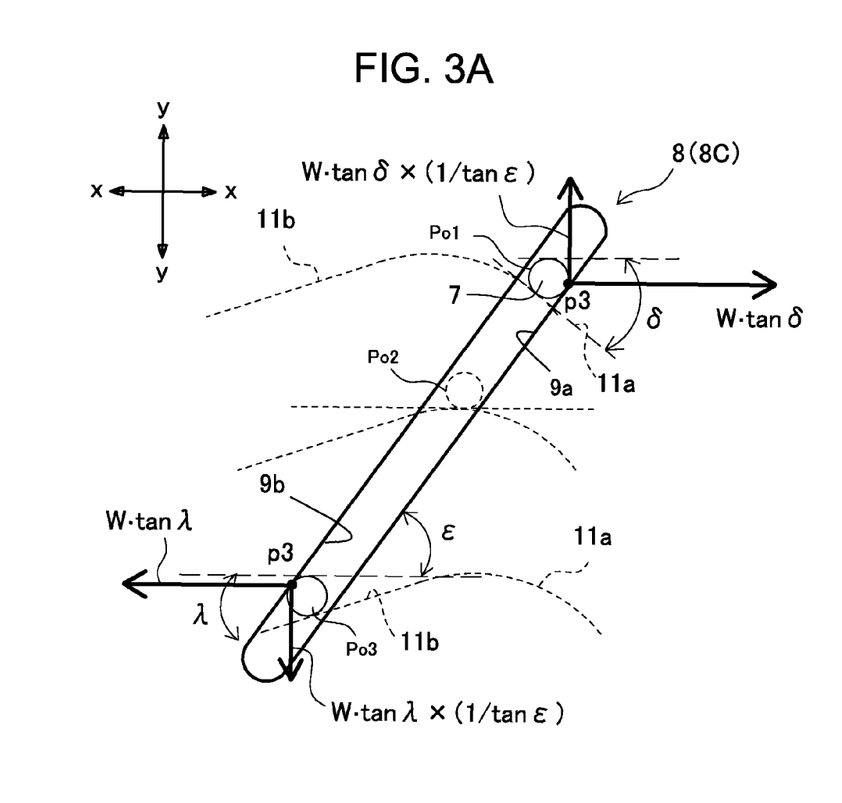
FIG. 3A illustrates a relationship of the force acting on the cam surface.
Figures 3B, 3C:
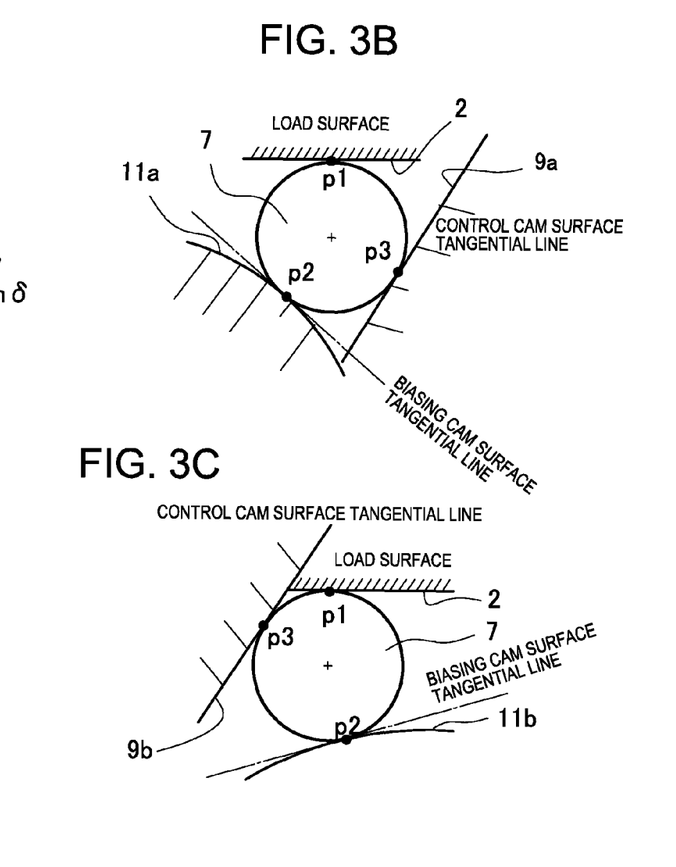
FIG. 3B illustrates the force relationship when the follower member is in a Po1 position as shown in the figure.
FIG. 3C illustrates the force relationship when the follower member is in a Po3 position as shown in the figure.

As shown in FIGS. 3A to 3C, the follower member 7 is acted upon by forces from three different directions in an engagement point p1 to cause the load of the heavy load 6 to act, an engagement point p2 of the biasing cam surface to bias the follower member 7 to the cam surface side, and an engagement point p3 of the cam surface of the cam member 8. Then, the engagement point p1 of the heavy load and the engagement point p2 of the spring force act in mutually opposed opposite directions, and the engagement point p2 of the spring force faces in the leftward direction in FIG. 3B, while facing in the rightward direction in FIG. 3C. Then, the engagement point p3 of the cam surface engages on the right side in FIG. 3B, while engaging from the left side in FIG. 3C.

Accordingly, in the follower member 7 are engaged the load of the heavy load and the spring force of the spring member 3 to oppose from above and below in the action direction of gravity, and concurrently, the three-point engagement relationship is formed to come into press-contact with the cam surface 9 of the cam member 8 at predetermined pressure. Then, the biasing force to bring the follower member 7 into press-contact with the cam surface 9 is applied from the biasing cam surface 11 (described later) for dividing the spring force of the spring member 3 into force components. The cam means and biasing means will be described below in this order.

[Cam Means]

As described above, the support frame 2 that supports the heavy load 6 is supported by the fixed frame 1 to be movable up and down in the direction in which gravity acts (vertical direction in FIG. 1A). The spring member 3 as described above is disposed between the fixed frame 1 and the support frame 2, and the cam member 8 having first and second cam surfaces 9a, 9b is disposed in the expansion/contraction direction (vertical direction in FIG. 1A).

The cam member 8 is disposed in the fixed frame 1 or an apparatus frame (not shown) different from the fixed frame 1. The cam member 8 is formed in the fixed frame 1, and is formed of a groove cam 8C having a predetermined length (S). The groove cam 8C is formed of mutually opposed first cam surface 9a and second cam surface 9b spaced a predetermined (groove) distance D apart. The distance D of the groove cam 8C is formed to be a distance (D≥d; d is the rod diameter) adapted to the rod diameter of the follower member 7. The distance D of the groove cam 8C shown in the figure forms a slight gap ga (clearance) from the rod diameter d, and is in the relationship of D=(d+ga).

The groove cam 8C shown in the figure is disposed in the direction having an angle θ with respect to the horizontal direction, and is set for an inclined angle θ (0°<θ<90°) such that the follower member 7 to engage moves up and down (vertical direction; x) in the expansion/contraction direction (up and down in FIG. 1A) of the spring member 3, while concurrently shifting in the orthogonal direction (horizontal direction; y). It is suitable to set the angle at about 30 degrees to 45 degrees.

Figure 2A:
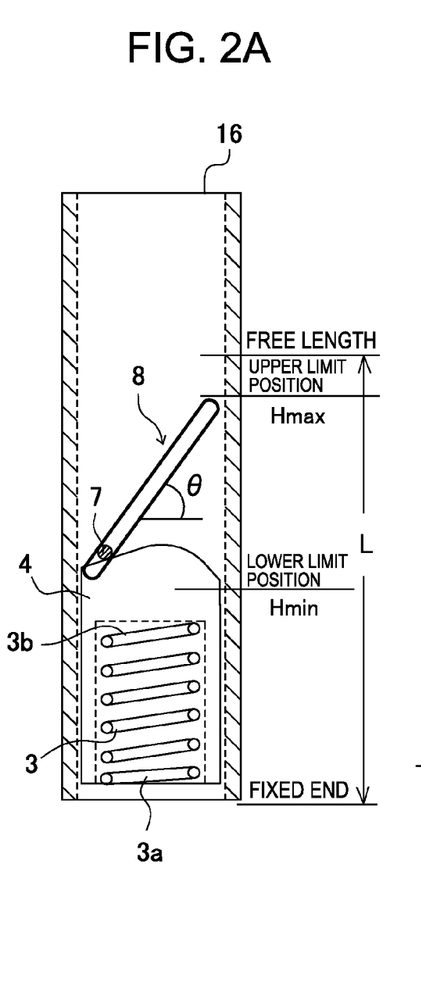
FIG. 2A is an explanatory view illustrating the entire configuration of a cam member.
Figure 2B:
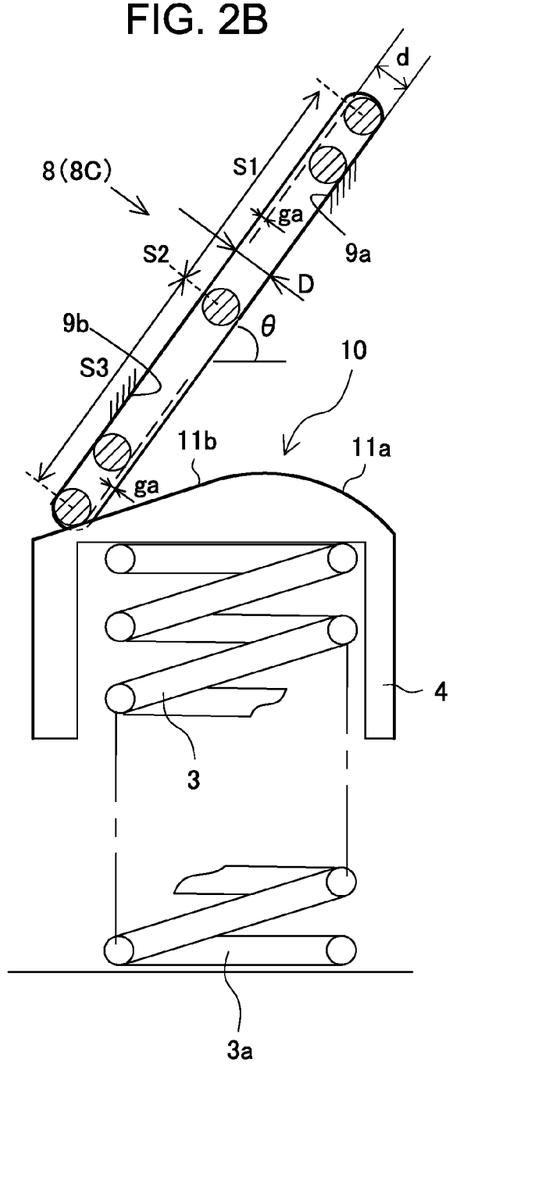
FIG. 2B is an explanatory view illustrating an engagement relationship between a cam surface and a follower member.

In addition, in the groove cam 8C, the second cam surface 9b is formed in the lower portion in the expansion/contraction direction of the spring, and the first cam surface 9a is formed in the upper portion (see FIG. 2B). Accordingly, in a state in which the spring member 3 contracts, the follower member 7 engages in the second cam surface 9b, while engaging in the first cam surface 9a in a state in which the spring member 3 expands. A neutral point S2 exits between the first cam surface 9a and the second cam surface 9b, and with the neutral point S2 therebetween, the first cam surface 9a is disposed in a stroke region S1, while the second cam surface 9b is disposed in a stroke region S1. Action of the first and second cam surfaces 9a, 9b will be described later.

In addition, the case is shown where the groove cam 8C is formed in the linear shape, but the shape is always not limited to the linear shape, and may be in the curved shape (semicircular shape). Then, the shape of the groove cam 8C is formed in the shape that is the most suitable for balancing the spring member 3 and the weight (W) of the heavy load. In this case, since the spring member 3 changes the spring force in proportion to an elongation amount, the shape is formed in a cam curve to correct the change amount by the cam surface.

[Biasing Means]

As described above, in the present invention, it is the object to balance the weight of the heavy load 6 with the spring member 3 to hold the heavy load in a predetermined height position, and the change in the load amount and the change in the height position are adjusted (smoothened) by friction forces between the follower member 7 (spring force transfer means) and cam surface 9 disposed between the heavy load and the spring member 3. Therefore, the need arises for biasing means for bringing the follower member 7 into press-contact with the cam surface 9 (9a, 9b) of the cam member 8 as described above. The biasing means 10 shown in the figure will be described below.

The Embodiment of FIGS. 1A and 1B show the case where the biasing member 10 is formed of the biasing cam surface 11 formed in the cap member 4 of the spring member 3. The biasing cam surface 11 is configured to apply force components of the spring force Fb of the spring member 3 to the follower member 7 in the spring expansion/contraction direction and the orthogonal direction.

FIGS. 2A and 2B show the detailed configuration of the biasing means 10, and FIGS. 3A to 3C show the relationship of force acting on the cam surface. As shown in FIGS. 2A and 2B, the cap member 4 is fitted into the free end 3b of the spring member 3, and the cam surface (reference numeral "11" in FIG. 2B) is formed on the surface of the member 4 in the direction (in the surface shown in the figure, in the orthogonal horizontal direction) crossing the expansion/contraction direction of the spring. The cam surface 11 branches (deflects) the spring force of the spring member 3 in the direction of biasing the follower member 7 to the cam surface 9 of the cam member 8 as described previously. Hereinafter, the cam surface integrated in the spring member 3 is referred to as the biasing cam surface 11 (11a, 11b), and the cam surface of the cam member 8 as described previously is referred to as the control cam surface 9 (9a, 9b).

The above-mentioned biasing cam surface 11 is formed in the cap member 4 attached to the free end 3b of the spring member 3, and is comprised of the cam surface 11a and cam surface 11b engaging in the follower member 7. The cam surface 11a applies the force in the direction of bringing the follower member 7 into press-contact with the first cam surface 9a, and the cam surface 11b applies the force in the direction of bringing the follower member 7 into press-contact with the second cam surface 9b. The press-contact force is transferred from the spring member 3 to the follower member 7 as the spring force. The biasing cam surface 11 is formed in a cam curve so that the cam surfaces 11a and 11b apply the press-contact forces to the follower member 7 in the different directions as described later.

In the above-mentioned configuration, a support mechanism of the follower member 7 will be described according to FIGS. 2A, 2B and 3A to 3C. The follower member 7 is comprised of the rod member substantially circular in cross section, and is nipped from three different directions by the spring force Fb of the spring member 3, drag N of the cam surface 9, and biasing force Fw of the biasing means 10. Then, the follower member 7 moves up and down in the action direction of gravity (vertical direction in FIG. 1A) between the upper limit position (Hmax) and the lower limit position (Hmin) along the cam surface 9, while being displaced in the expansion/contraction direction (the arrow x in FIG. 3A) of the spring and the direction (the arrow y in FIG. 3A) crossing the expansion/contraction direction.

The first cam surface 9a is set in the region to support the load Fw (weight of the heavy load; the same in the following description) by the spring force and the friction force (friction force between the cam surface and the follower member 7) to achieve a balance when the spring force Fb is smaller than the load Fw. In other words, when the follower member 7 is in the Po2 position as shown in FIG. 3A, the follower member 7 engages in the cam surface 9a, and is supported in the angle direction in which the cam surface 9a pushes (lifts) the follower member 7 upward.

Further, the second cam surface 9b is set in the region such that the friction force suppresses the spring force Fg to achieve a balance between the load Fw and the spring force when the spring force Fb is larger than the load Fw. In other words, when the follower member 7 is in the Po3 position as shown in FIG. 3A, the follower member 7 engages in the cam surface 9b at an angle λ (tangential angle), and is supported in the angle direction in which the cam surface 9b pushes the follower member 7 downward (the spring force is suppressed). In addition, in the present invention, the biasing means 10 for bringing the follower member 7 into press-contact with the cam surface 9 may be an inclined surface integrally-formed in the cap member 4.

[Relationship of Force Acting on the Follower Member]

The action relationship of force acting on the follower member 7 fitted into the cam member 8 will be described according to FIGS. 3A to 3C. When energy stored in the spring member 3 is small (the loading portion 2a is in the high position in FIG. 3A: Po1 position), as shown in FIG. 3B, the biasing cam surface 11a applies the force component of the spring force of the spring member 3 to the follower member 7 in the normal direction in the p2 position. Further, the control cam surface 9a and the load of the heavy load act in the p1 position. Then, as shown in FIG. 3B, the p1 point in which the load of the heavy load acts, the action point p2 of the biasing cam surface 11a and an action point p3 of the control cam surface 9a form a triangle with the P1 point as the vertex. Then, in the relationship of force, the force for shifting rightward (the direction coming into press-contact with the cam surface) in FIG. 3A occurs in the follower member 7, and is expressed by W·tan δ.

The follower member 7 pressed against the first cam surface 9a by the above-mentioned force of W·tan δ acts in the direction of running up the inclination (inclined angle ε) of the control cam surface 9a, and the upward force component is expressed by W·tan δ×(1/tan ε).

Accordingly, the force acting on the support frame 2 provided with the loading portion 2a is as described below.

[Force acting on the heavy load loading portion]=
[Elastic force of the spring member]+[W·tan δ×(1/tanε)]

In addition, W; weight of the heavy load, δ; angle between the engagement tangential line of the support frame and the engagement tangential line of the biasing cam surface with respect to the follower member, and ε; angle in the tangential line direction of the control cam surface engaging in the follower member.

(2) When energy stored in the spring member is large (the loading portion 2a is in the low position in FIG. 3A; Po3 position) i.e. the loading portion 2 is in the low position, the position of the follower member 7 shifts to vary the hit angle with respect to the cam surface 9. Accordingly, also when the loading portion 2a is in the low position, as in the high position, the follower member 7 is pressed against the cam surface 9a by the force; W·tan λ for shifting in the horizontal leftward direction. The pressing force acts in the direction of running down the inclination (inclined angle ε) of the cam surface 9a, and the downward component of the force is expressed by W·tan λ×(1/tanε).

Accordingly, the force acting on the support frame 2 provided with the loading portion 2a is as described below.

[Force acting on the heavy load loading portion]=
[Elastic force of the spring member]−[W·tan λ×(1/tan ε)]

In addition, W; weight of the heavy load, λ; angle between the follower member and the engagement surface of the support frame, and ε; angle in the tangential line direction of the control cam surface engaging in the follower member.

As can be seen from the above-mentioned description, in the present invention, the spring force of the spring member 3 is transferred to the support frame 2 having the loading portion 2a via the follower member 7. At this point, the cam follower member 7 is shifted arbitrarily in the expansion/contraction direction of the spring and at the same time in the direction crossing the expansion/contraction direction along the cam surface 9 (9a, 9b) to balance the spring force of the spring member 3 and the load of the heavy load, and is moved up and down. Then, in the cam surface 9 are formed the first cam surface 9a (stroke region S1) to increase the spring force Fb and the second cam surface 9b (stroke region S1) to decrease the spring force. In the first cam surface 9a, the cam surface engages in the angle direction for lifting the follower member 7, and prevents the follower member 7 from dropping in cooperation with action of the spring force. Further, in the second cam surface 9b, the cam surface engages in the angle direction for pushing down the follower member 7, and suppresses the spring force to prevent the follower member 7 from shifting in the upward direction.

Further, the neutral point S2 is set at a change point positioned at midpoint between the stroke regions S1 and S1, and is a position in which the load of the heavy load and the spring force of the spring 3 are substantially faced (force relationship of not receiving the effect of the cam surface). The point shifts to the first cam surface 9*a* when external forces act in the direction of pushing up the support frame 2, while shifting to the second cam surface 9*b* when external forces act conversely in the direction of pushing down.

Then, on the first cam surface 9*a*, even when the spring force is decreased by expansion of the spring member 3, the position is held in the position by action of the cam surface 9*a* (FIG. 3A: Po1 position). On the second cam surface 9*b*, even when the spring force is increased by contraction of the spring member 3, the position is held in the position by action of the cam surface (FIG. 3A: Po3 position). Accordingly, it is possible to hold the heavy load in an arbitrary height position by setting the shape of the cam surface, particularly, the cam curve of angle $\epsilon$ as described previously.

In addition, in the present invention, as the spring member 3, the Embodiment is described in which the coil spring is disposed which expands and contracts in the direction (vertical direction) of gravity acting on the heavy load W, and the spring may be disposed to expand and contract while being inclined a predetermined angle with respect to the vertical direction. In this case, it is efficient to set the force relationship of balancing the vertical direction component of the spring force of the coil spring with weight of the heavy load W, and the force relationship in which the horizontal direction component brings the follower member 7 into press-contact with the cam surface.

[Embodiment 2]

Figure 4A:
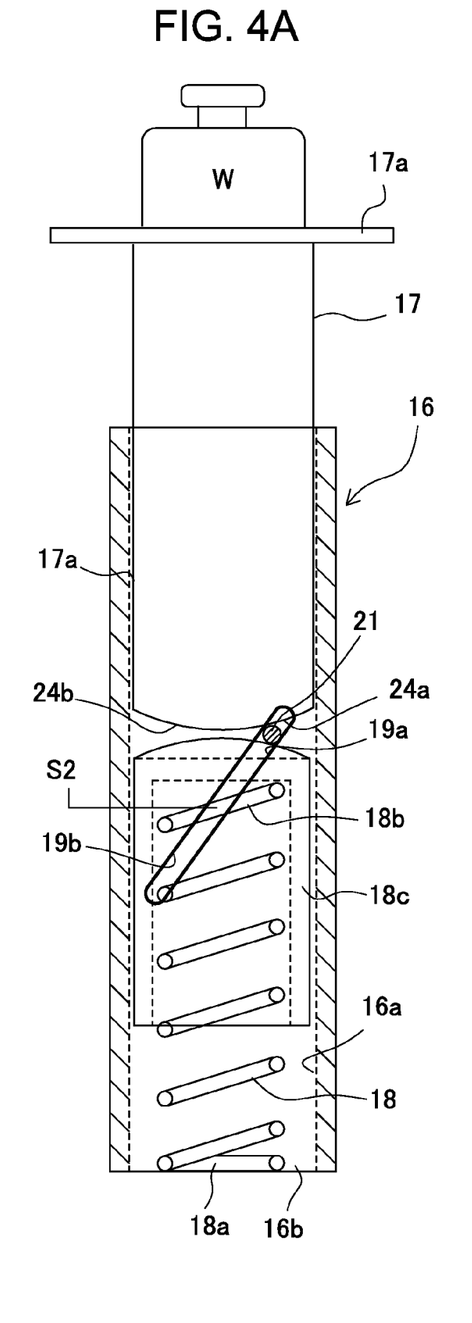
FIG. 4A illustrates a relationship of force when the spring member expands.
Figure 4B:
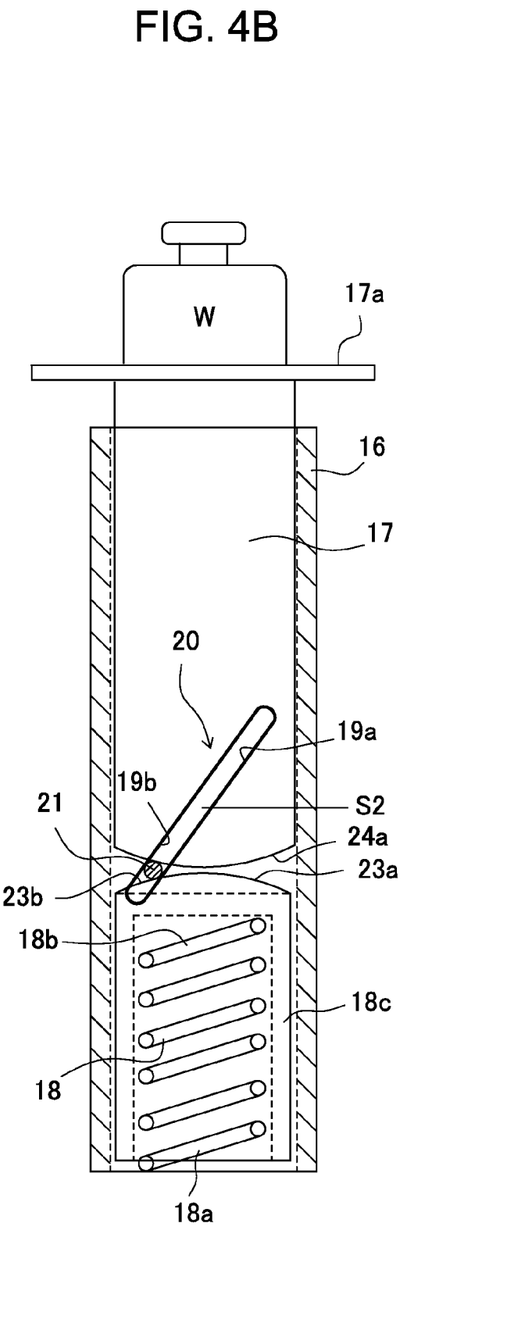
FIG. 4B illustrates a relationship of force when the spring member contracts.

The heavy load loading apparatus A as shown in FIGS. 4A and 4B will be described next. Embodiment 1 as described previously shows the case where the biasing means 10 is comprised of the biasing cam surface 11 provided on the free end of the spring member 3. As the biasing cam surface, it is also possible to form the biasing cam surface on the mutually opposed spring member side and the press cam surface on the support frame side, and this Embodiment will be described.

As shown in FIGS. 4A and 4B, a fixed frame 16 is fixed to an installation surface such as the ceiling of the building and the top of the mechanical apparatus. The fixed frame 16 is configured in frame structure in the shape of a hollow cylinder, and is provided with a fit portion 16*a*. A fit portion 17*a* of a support frame 17 is fitted into the fit portion 16*a*, and the fixed frame 16 and support frame 17 are configured to be able to expand and contract in the action direction (vertical direction) of gravity.

The above-mentioned fixed frame 16 is provided with a spring fix portion 16*b*, and a fixed end 18*a* of a coil spring 18 is fixed. Further, a cap member 18*c* is fitted into a free end 18*b* (top portion in FIGS. 4A and 4B) of the coil spring 18, and this cap member is supported to be able to move up and down inside the fixed frame.

On the other hand, the support frame 17 is provided with a placement portion 17*a* to support the heavy load W placed thereon. In other words, the heavy load W supported on the support frame 17 is held in the height position in a state in which the weight and the spring force of the spring member 18 are balanced.

Further, in the fixed frame 16 is disposed cam means 20 having a cam surface 19 in the expansion/contraction direction (vertical direction) of the spring 18. The cam surface 19 is to stabilize the height position of the heavy load W supported by the spring member 18 (the action is the same as in Embodiment 1).

The above-mentioned cam surface 19 is comprised of a groove cam having a first cam surface 19*a*, neutral point S2 and second cam surface 19*b* in the expansion/contraction direction, and adjusts strength of the spring force of the spring member 18 that supports the heavy load W via a follower member 21 described later. The first cam surface 19*a* is formed in the cam surface for causing the spring member 18 to act with a large spring force in the expanded state, and the second cam surface 19*b* is set for the cam surface for causing the spring member 18 to act with a small spring force in the contracted state. Then, the neutral position S2 is set at a change point (point or region) positioned at midpoint between the first cam surface 19*a* and the second cam surface 19*b*. A configuration of a groove cam 20 constituting the first and second cam surfaces is the same as in Embodiment 1.

On the above-mentioned first cam surface 19*a*, the load of the heavy load is supported in cooperation between the spring force of the spring member 18 and the friction force of the cam surface 19*a*. On the second cam surface 19*b*, the cam surface acts so as to reduce the spring force by the spring member 18. In other words, when the spring member 18 expands and the spring force is weak, the follower member 21 engages in the first cam surface 19*a* to support the heavy load together with the spring member 18. On the other hand, when the spring member 18 contracts and the spring force is strong, the follower member 21 engages in the second cam surface 19*b*, and decreases the spring force to support the heavy load. Then, in the neutral point S2 , the spring force by the spring member 18 and gravity by the heavy load M are mutually opposed and form a balanced state. The action of the above-mentioned cam surface of the first cam surface 19*a* and second cam surface 19*b* is the same as in Embodiment 1, and the description thereof is omitted.

Then, described is biasing means 22 for bringing the follower member 21 into press-contact with the first and second cam surfaces 19*a*, 19*b* to generate friction forces. In the above-mentioned spring member 18, the cap member 18*c* is fitted into its free end 18*b*, and a biasing cam surface 23 is formed in the cap member. A configuration of the biasing cam surface 23 is the same as in Embodiment 1.

The above-mentioned biasing cam surface 23 is formed in the cap member 18*c* attached to the free end 18*b* of the spring member 18, and is comprised of a cam surface 23*a* and cam surface 23*b* engaging in the follower member 21. The cam surface 23*a* applies a force in the direction of bringing the follower member 21 into press-contact with the first cam surface 19*a*, and the cam surface 23*b* applies a force in the direction of bringing the follower member 21 into press-contact with the second cam surface 19*b*. The press-contact force is transferred from the spring member 18 to the follower member 21 as the spring force. The biasing cam surface 23 is formed in a cam curve so that the cam surfaces 23*a* and 23*b* apply the press-contact forces to the follower member 21 in the different directions as described later.

To the above-mentioned follower member 21 are transferred the spring force of the spring member 18 from the biasing cam surface 22, and concurrently therewith, the load of the heavy load from the support frame 17, and when the spring force and load are balanced, the support frame is held in the position. Then, in the Embodiment as shown in the figure, press cam surfaces 24*a* and 24*b* are formed in the support frame 17.

Figure 5A:
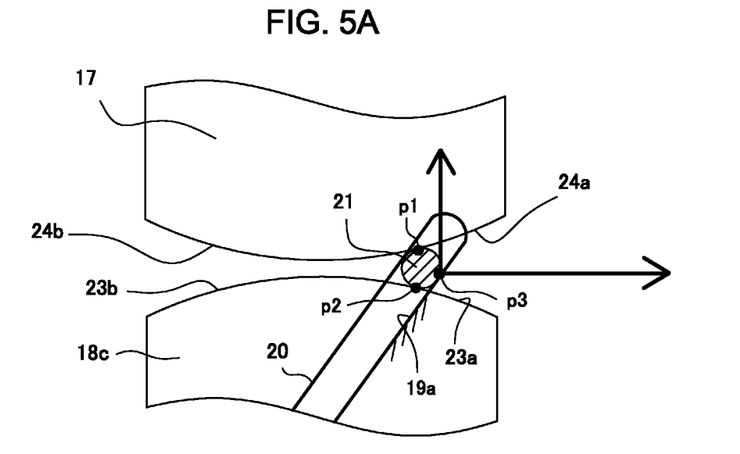
FIG. 5A shows a state in which the spring member expands.

The configuration and action will be described. FIG. 5A shows a state in which the spring member 18 expands, which is the case where external forces for lifting upward act on the support frame 17 or heavy load. At this point, the follower member 21 is nipped by the biasing cam surface 23*a* and press cam surface 24*a* vertically, and receives the force in the arrow direction (rightward direction) shown in the figure. By this means, the follower member 21 is brought into press-contact with the first cam surface 19*a* and the friction force occurs.

The friction force acts in the direction for preventing the heavy load from dropping by gravity, and therefore, the heavy load is held in the position by the spring force of the spring member 18 and the friction force of the cam surface.

Figure 5B:
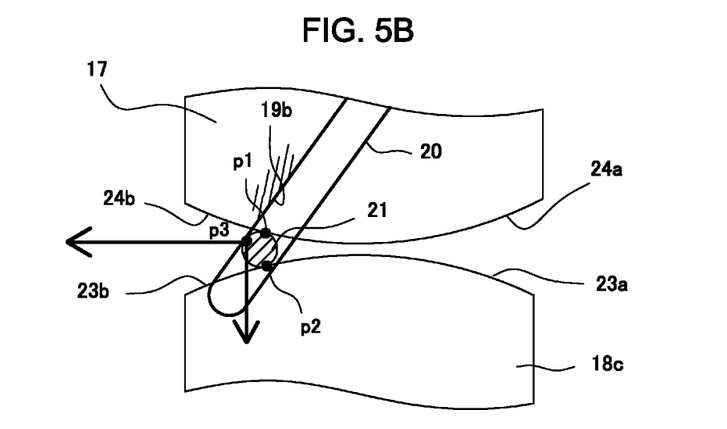
FIG. 5B shows a state in which the spring member contracts.

FIG. 5B shows a state in which the spring member 18 contracts in which external forces for pressing down below the support frame 17 or heavy load act. At this point, the follower member 21 is nipped by the biasing cam surface 23b and press cam surface 24b vertically, and receives the force in the arrow direction (leftward direction) shown in the figure. By this means, the follower member 21 is brought into press-contact with the second cam surface 19b and the friction force occurs. The friction force acts in the direction for preventing the follower member 21 from moving upward by the spring force, and therefore, the heavy load is held in the position without shifting upward by the spring force of the spring member 18.

In the above-mentioned configuration, a support mechanism of the follower member 21 will be described according to FIGS. 5A and 5B. The follower member 21 is comprised of a rod member substantially circular in cross section, and is nipped from three different directions by the spring force Fb of the spring member 18, drag of the cam surface 19, and biasing force Fw of the biasing means 20. Then, the follower member 21 moves up and down in the action direction of gravity (vertical direction in FIG. 1A) between an upper limit position (Hmax) and a lower limit position (Hmin) along the cam surface 19, while being displaced in the expansion/contraction direction (the arrow x in FIG. 3A) of the spring and the direction (the arrow y in FIG. 3A) crossing the expansion/contraction direction.

Industrial Applicability

The present invention relates to the mechanism for supporting a heavy load by the spring force of the spring member disposed between the support frame for supporting the heavy load and the fixed frame, and has industrial applicability.

In addition, this application claims priority from Japanese Patent Application No. 2013-092162 incorporated herein by reference.

What is claimed is:

1. A heavy load support mechanism for supporting a heavy load, comprising:
   a fixed frame;
   a support frame disposed to relatively approach and separate from the fixed frame;
   a spring member disposed between the fixed frame and the support frame to expand and contract in a shift direction of the support frame;
   a follower member disposed movably in a direction crossing an expansion or contraction direction of the spring member to transfer a spring force of the spring member to the support frame;
   a cam member for adjusting increase or decrease of action of the spring force exerted on the support frame from the spring member, having a first cam surface and a second cam surface to be press-contacted with the follower; and
   a biasing member for press-contacting the follower member with the the first cam surface and the second cam surface, including a biasing cam disposed on a free end of the spring member and having a biasing cam surface separately formed from the first cam surface and the second cam surface, the biasing cam surface being engaged with the follower member and applying a biasing force in the direction crossing the expansion or contraction direction to the follower member through the spring force of the spring member,
   wherein the first cam surface and the second cam surface balance weight of the heavy load and the spring force of the spring member acting on the follower member, the first cam surface is engaged with the follower member so as to generate a friction force to reduce the weight of the heavy load exerted on the follower member, and the second cam surface is engaged with the follower member so as to generate a friction force to reduce the spring force exerted on the follower member,
   the follower member shifts in the expansion or contraction direction of the spring member and concurrently in the direction crossing the expansion or contraction direction along the first and second cam surfaces through the spring force of the spring member, a biasing force of the biasing member and the weight of the heavy load.

2. The heavy load support mechanism according to claim 1, wherein the cam member includes a groove cam, disposed in the fixed frame and having a stroke length inclined in a direction crossing at a predetermined angle with respect to the expansion or contraction direction of the spring member.

3. The heavy load support mechanism according to claim 1, wherein the follower member is formed in a substantially circular cross section,
   the follower member includes a load imposed surface on which the weight of the heavy load acts, a friction surface on which the friction force of the cam member acts, and a biasing surface on which the biasing force of the biasing member acts, each having mutually different tangential angles, and
   the load imposed surface is disposed to contact the support frame, the friction surface is disposed to contact the cam member, and the biasing surface is disposed to contact the biasing member.

4. The heavy load support mechanism according to claim 1, wherein the first and second cam surfaces are disposed in order of the second cam surface for reducing the action of the spring force and the first cam surface for reducing action of the weight of the heavy load in the expansion or contraction direction of the spring member, and balance the weight of the heavy load and the spring force of the spring member acting on the follower member.

5. The heavy load support mechanism according to claim 1, wherein the fixed frame includes a spring fixing portion to fix the spring member, the support frame includes a weight support portion to load and support the heavy load or to load the heavy load, and the fixed frame and the support frame are coupled with fit portions that are mutually fitted slidably.

6. A heavy load loading apparatus comprising:
   heavy load support member which loads and supports a heavy load; and
   the heavy load support mechanism according to claim 1, wherein the heavy load support mechanism supports the heavy load support member in a predetermined height position through the spring force of the spring member, and
   the spring member is disposed to expand and contract in a gravity direction acting on the heavy load.

7. The heavy load support mechanism according to claim 2, wherein the first cam surface is formed at an upper portion of the groove cam in the expansion or contraction direction of the spring such that the first cam surface is engaged with the follower when the spring member expands, and the second cam surface is formed at a lower portion of the groove cam in the expansion or contraction direction of the spring such that the second cam surface is engaged with the follower when the spring member contracts.

8. The heavy load support mechanism according to claim 7, wherein the spring member includes a cap member disposed on the free end thereof, and the biasing member is formed on an upper surface of the cap member, and the biasing cam surface has a first biasing cam surface and a second biasing cam surface to form a cam curve such that the first biasing cam surface applies a press-contact force to the first cam surface and the second cam surface applies the press-contact force to the second cam surface.

9. The heavy load support mechanism according to claim 8, wherein the support frame has a flat surface at a lower end thereof.

10. The heavy load support mechanism according to claim 8, wherein the support frame has a first press cam surface and a second press cam surface such that the follower member is nipped between the first biasing cam surface and the first press cam surface vertically when the spring member expands, and the follower member is nipped between the second biasing cam surface and the second press cam surface vertically when the spring member contracts.

11. The heavy load support mechanism according to claim 1, wherein the biasing cam surface is arranged to always contact the follower member while the spring member expands and contracts in the shift direction of the support frame.

* * * * *